(12) United States Patent
Takeda

(10) Patent No.: US 6,781,635 B1
(45) Date of Patent: Aug. 24, 2004

(54) DISPLAY PROCESSING SYSTEM, AND PORTABLE TERMINAL AND CONVERSION ADAPTOR USED THEREFOR

(75) Inventor: Genyo Takeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 409 days.

(21) Appl. No.: 09/637,084

(22) Filed: Aug. 11, 2000

(30) Foreign Application Priority Data

Jun. 8, 2000 (JP) ........................................ 2000/172170

(51) Int. Cl.[7] ............................. H04N 7/14; H04Q 7/20; G06F 19/00
(52) U.S. Cl. .................... 348/552; 348/14.01; 455/556; 702/3
(58) Field of Search ............................. 348/552, 14.01, 348/14.02, 14.04, 838; 702/3, 63; 455/556, 557, 550, 572, 573

(56) References Cited

U.S. PATENT DOCUMENTS

| | | | | |
|---|---|---|---|---|
| 5,825,408 A | * | 10/1998 | Yuyama et al. ................ | 348/14 |
| 5,920,806 A | * | 7/1999 | Gouessant .................... | 455/66 |
| 5,920,827 A | * | 7/1999 | Baer et al. ...................... | 702/3 |
| 6,122,526 A | * | 9/2000 | Parulski et al. ............. | 455/556 |
| 6,249,313 B1 | * | 6/2001 | Nishi .......................... | 348/233 |
| 6,330,021 B1 | * | 12/2001 | Devaux .................... | 348/14.04 |
| 6,445,932 B1 | * | 9/2002 | Soini et al. ................. | 455/556 |
| 6,459,906 B1 | * | 10/2002 | Yang .......................... | 455/556 |
| 6,463,299 B1 | * | 10/2002 | Macor ........................ | 455/556 |
| 6,505,055 B1 | * | 1/2003 | Kahn et al. ................. | 455/556 |

* cited by examiner

Primary Examiner—Michael H. Lee
Assistant Examiner—Paulos M. Natnael
(74) Attorney, Agent, or Firm—Nixon & Vanderhye P.C.

(57) ABSTRACT

A display processing system 10 includes a portable phone 20, a conversion adaptor 40, a controller 50, and a television monitor 60. When the portable phone 20 is attached to the conversion adaptor 40 to be connected therewith and receives a display switching signal from the controller 50, the CPU 23 supplies image display data to a video memory 44 and supplies audio data to an audio buffer 46. Thereby, the television monitor 60 displays an image and a speaker of the television monitor 60 outputs audio. In this manner, it is possible to display, on a large screen of the television monitor 60, game images based on game data, and various kinds of characters and symbols such as news, weather report, fortune-telling, or the like, received from information providing servers by the portable terminal 20.

17 Claims, 13 Drawing Sheets

PORTABLE PHONE IS CONNECTED TO TELEVISION.
HOW DO YOU LIKE THE DISPLAY MODE ?

1, DISPLAY ONLY ON TELEVISION SCREEN
2, DISPLAY ON BOTH TELEVISION SCREEN
   AND LCD OF PORTABLE PHONE

F I G. 8
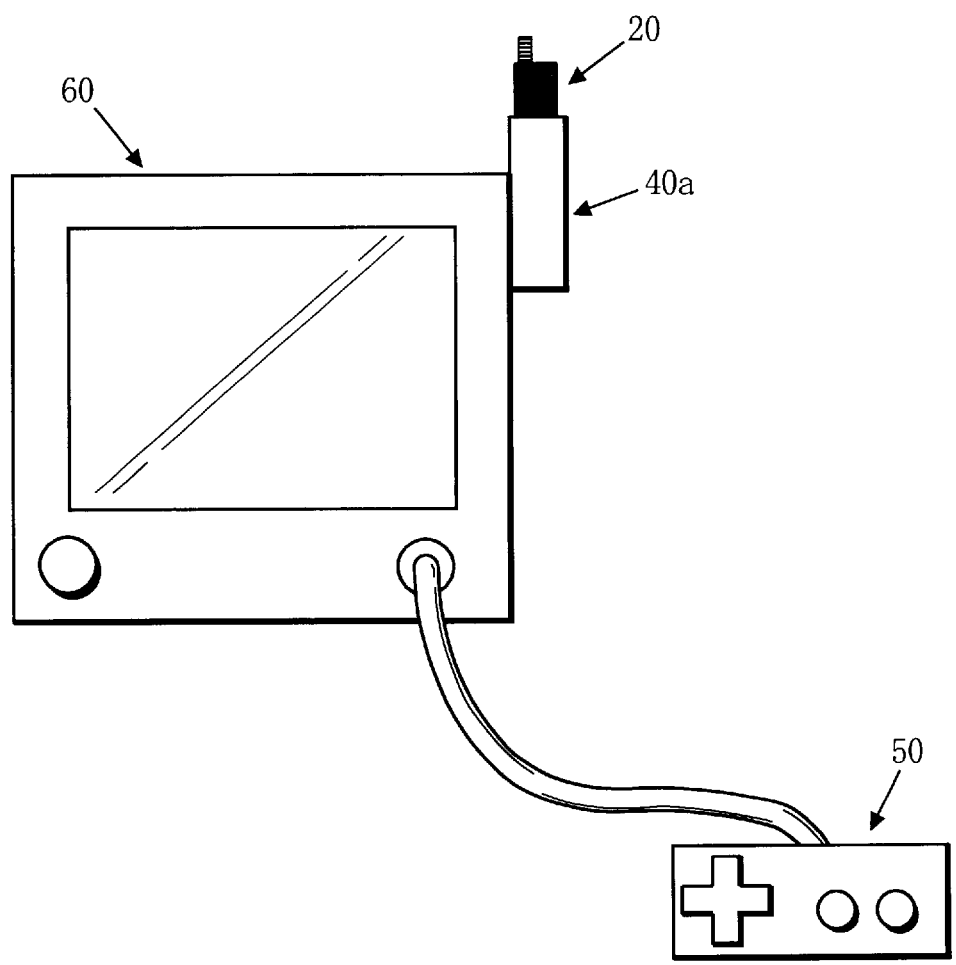

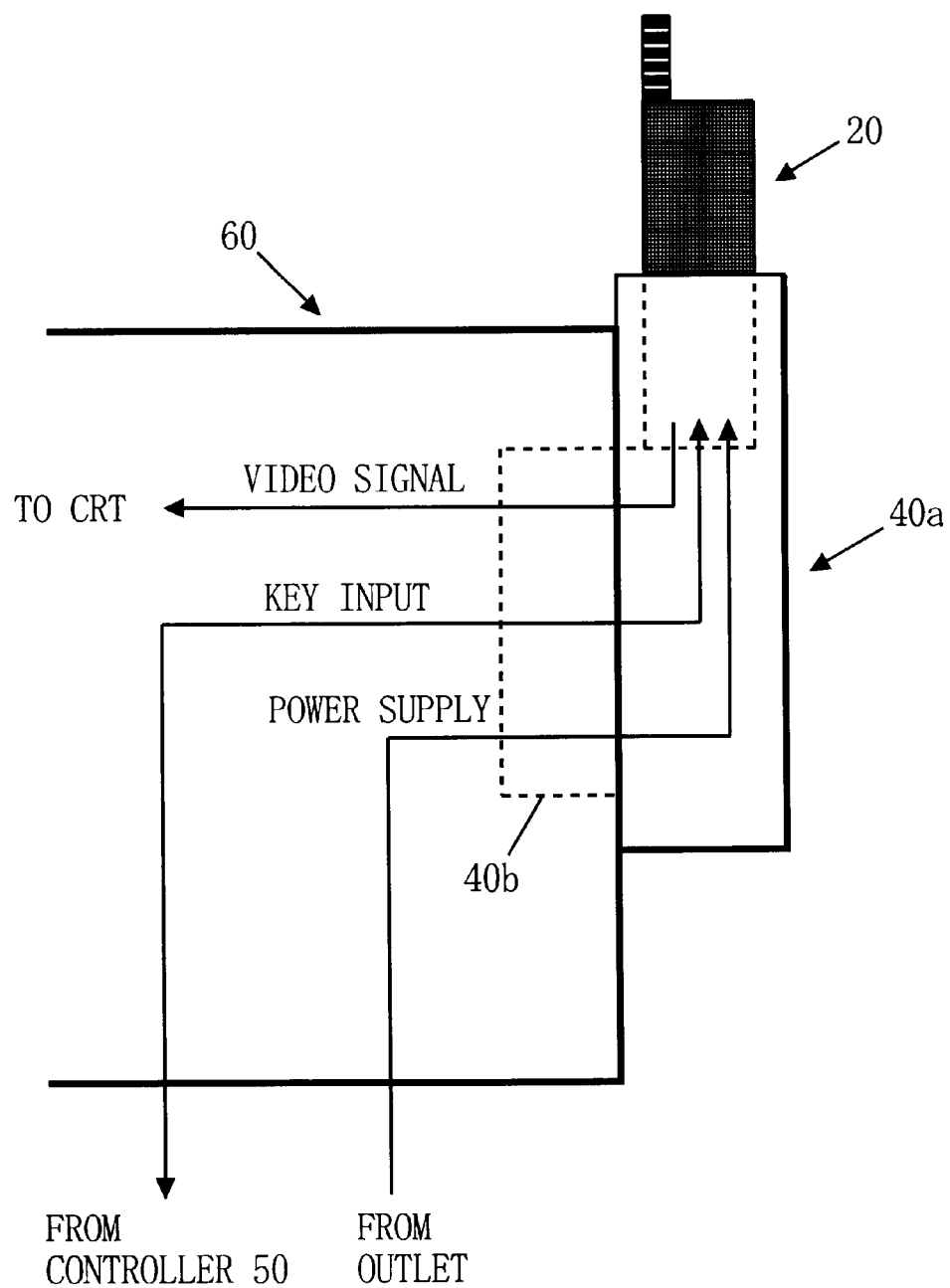
F I G. 9

DISPLAY PROCESSING SYSTEM, AND PORTABLE TERMINAL AND CONVERSION ADAPTOR USED THEREFOR

BACKGROUND OF THE INVENTION

1. Field of the Invention

The present invention relates to display processing systems, and portable terminals and conversion adaptors used therefor and, more specifically, to a display processing system, and a portable terminal and a conversion adaptor used therefor enabling large-screen display of data on a television monitor instead of display on an LCD of the portable terminal. Such data includes image data for games, character and symbol data such as news and weather reports received by the portable terminal, or data registered therewith.

2. Description of the Background Art

The conventionally-known portable terminal includes a portable phone, for example. As well known, such conventional portable phone is provided with an LCD that is integrally constructed on its main body. The LCD displays various screens (e.g., menu screen, reference screen of registered addresses) thereon. A user can carry out various operations while watching the screens on the LCD.

Recently, in addition to an originally-provided telephone service, many new communication services are available for the portable phone. Such services allow, for example, transmitting/receiving of e-mails, and accessing to the Internet. The recent portable phone, as does a personal computer access to information providing servers via the Internet, directly accesses to the information providing servers and downloads therefrom various distribution data that a user requires. The distribution data includes daily information such as news, weather reports and fortune-telling, and music data, game data, and the like. If any image data is included in the downloaded distribution data, such image data is displayed on the LCD of the portable phone. If the game data is downloaded, for example, the game can be played on the LCD. As such, recent portable phones increase occasions for displaying various image contents thereon.

The portable phone is designed by giving highest priority on its portability. Therefore, the display screen of the LCD provided thereon is inevitably small. Accordingly, the LCD of the portable phone, in comparison with that of the personal computer, can display a significantly small amount of information and a small number of characters on a single screen. This is also true when graphics/symbols, game characters, and the like, are displayed. Such small sized LCD screens are disadvantageous when displaying an e-mail containing many characters and a homepage laid out with a large-screen display in mind. In such cases, the visibility of the screen is impaired, thereby imposing considerable inconvenience on the user. For example, the small screen is inconvenient when a game is played on the portable phone by using downloaded game data with game characters displayed on the small LCD. In such a case, the positional relation between characters and slight collisions occurred therebetween are difficult to recognize. Accordingly, an appropriate operation of a player may be hindered, and in some cases, he/she may lose aspirations for playing the game. Further, to display a color image included in the image contents, an LCD of the portable phone must have a color display which is relatively expensive. Still further, the conventional portable phone has been designed to be driven by a battery. It is therefore difficult to drive the CPU with high-speed. When the CPU is driven at high-speed, the amount of power consumed increases which reduces the battery life. Accordingly, the conventional portable phone also has a drawback of lacking speed for displaying moving pictures.

On the other hand, the portability of the portable phone is most utilized while the user is going out. The portability, however, is not so important when the user is staying at a specific place (e.g., home and office). Therefore, when the user is staying at the specific place, by utilizing a data processing function of the portable phone, various image contents displayed on the LCD may be alternatively displayed on a large screen such as a television receiver (or CRT display). As a result, visibility of the images of characters or game characters, and user's convenience are improved.

SUMMARY OF THE INVENTION

Therefore, an object of the present invention is to provide a display processing system, and a portable terminal and a conversion adaptor used therefor capable of displaying an image being displayed on a small display of a portable terminal on an external display of larger screen size.

A first aspect of the present invention is directed to a display processing system processing image data and displaying an image, which includes:

a portable terminal having a external communication function and equipped with a liquid crystal display;

a television monitor; and a conversion adaptor capable of attaching the portable terminal thereto in a detachable manner, and connected to the television monitor, wherein the portable terminal includes:

an image data storage part for storing image data obtained through communication and/or generated internally;

a program data storage part for storing program data;

a processing part for carrying out predetermined processings in accordance with the program data stored in the program data storage part; and a liquid crystal display driving part for driving, for display, the liquid crystal display, the conversion adaptor includes a video signal conversion part, the processing part, as one of the processings carried out in accordance with the program data, carries out processing for processing the image data stored in the image data storage part to generate image display data for each frame and switching a destination for supplying the generated image display data, the liquid crystal display driving part drives the liquid crystal display for display based on the image display data supplied from the processing part, the video signal conversion part converts, when the portable terminal is attached to the conversion adaptor, the image display data supplied from the processing part into a video signal and outputs the video signal to the television monitor, and the television monitor displays an image in accordance with the video signal supplied from the video signal conversion part.

As described above, in the first aspect of the invention, the image display data generated by the portable terminal is converted into the video signal by the conversion adaptor and then supplied to the television monitor. Therefore, the image displayed on the liquid crystal display of the portable terminal can be displayed also on the television monitor. Accordingly, under the circumstances enabling the use of the television monitor, such as when staying at home, the user can check the image originally displayed on the liquid crystal display of the portable terminal on the large screen of the television monitor, thereby achieving greater visibility of the image.

In the preferred embodiments of the invention, the conversion adaptor is provided with a recharging part for recharging the portable terminal. In this manner, the image can be displayed on the television monitor while the portable terminal is being recharged. Further, the conversion adaptor may be separable into a first housing accommodating the video signal conversion part and a second housing accommodating the recharging part, and the first and second housings may be structured such that they are detachable from each other. The image display data supplied from the processing part to the conversion adaptor is preferably temporarily stored in a first temporary storage part, read based on predetermined timing, and then outputted to the signal conversion part.

In the preferred embodiments, the image display data is supplied to the liquid crystal display driving part when the portable terminal is not attached to the conversion adaptor, and to at least the conversion adaptor when attached. In this manner, the image is automatically displayed on the television monitor when the portable terminal is attached to the conversion adaptor.

The portable terminal may be structured as a device supporting multimedia which handles audio data in addition to image data. In such case, in the portable terminal, the processing part carries out processing for reading audio data stored in an audio data storage part in relation to timing for generating the image display data and switches a destination for supplying the read audio data in correspondence with the destination for the image display data. Herein, the destination for the audio data is switched between a speaker driving part for driving a speaker of the portable terminal and the conversion adaptor. The display image data supplied from the processing part to the conversion adaptor is temporarily stored in the first temporary storage part. The audio data supplied from the processing part to the conversion adaptor is temporarily stored in a second temporary storage part. The image display data stored in the first temporary storage part and the audio data stored in the second temporary storage part are read on synchronized timing and then outputted to the video signal conversion part and an audio signal conversion part, respectively. Further, the image data storage part and the audio data storage part may be structured in a detachable manner from a body of the portable terminal.

In the preferred embodiments, a first operation part is connected to the conversion adaptor, and the processing part of the portable terminal carries out processing made in response to an operation signal from the first operation part. The first operation part may be connected to the conversion adaptor through a cable or wirelessly. When the image is displayed on the television monitor, various instructions or commands can be issued to the processing part through actuation of the first operation part. In this manner, operability is improved in comparison with the case of operation through a second operation part provided on the portable terminal which is small in size. Further, it is also possible to transmit a control signal from the processing part to the first operation part. For example, the control signal causing vibration of the first operation part may be transmitted.

In a second aspect of the present invention, the portable terminal is attached in a detachable manner to a recharging part externally attached to the television monitor. The video signal conversion part is incorporated in the television monitor. Other constituents are the same as those in the above described first aspect. An operation part for supplying an operation signal to the processing part in the portable terminal may be relationally connected to the television monitor.

A third aspect of the present invention is directed to a portable terminal detachable from a conversion adaptor connected to a television monitor and having an external communication function, including:

a liquid crystal display;

an image data storage part for storing image data obtained through communication and/or generated internally;

a program data storage part for storing program data;

a processing part for carrying out predetermined processings in accordance with the program data stored in the program data storage part; and a liquid crystal display driving part for driving, for display, the liquid crystal display, wherein the processing part, as one of the processings carried out in accordance with the program data, carries out processing for processing the image data stored in the image data storage part to generate image display data for each frame and switching a destination for supplying the generated image display data between the liquid crystal display driving part and the conversion adaptor, the liquid crystal display displays an image based on the image display data when the image display data is supplied to the liquid crystal display driving part, and the television monitor displays the image when the image display data is supplied to the conversion adaptor.

A fourth aspect of the present invention is directed to a portable terminal attachable to an external power supply and having an external communication function, comprising:

a rechargeable battery used as an internal power supply; and a power mode switching part for switching a power consumption mode depending on which of the rechargeable battery and the external power supply supplies operation power, wherein the power mode switching part switches the power consumption mode to a power saving mode for low power operation when the operation power is supplied from the rechargeable battery, and to a normal power mode for higher power operation than the power saving mode when the operation power is supplied from the external power supply.

As described above, in the fourth aspect, the power consumption mode is switched depending on whether the operation power is supplied from the internal power supply or from the external power supply. Thereby, the power consumption mode can be appropriately selected for the use condition of the portable terminal.

A fifth aspect of the present invention is directed to a conversion adaptor connected to a television monitor and capable of attaching a portable terminal thereto in a detachable manner, comprising a video signal conversion part for converting image display data for each frame supplied from the portable terminal into a video signal and outputting the video signal to the television monitor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an external view of a display processing system according to a third embodiment of the present invention;

FIG. 9 is a conceptual diagram showing signal flow in the third embodiment;

DESCRIPTION OF THE PREFERRED EMBODIMENTS

First Embodiment

Figure 1:
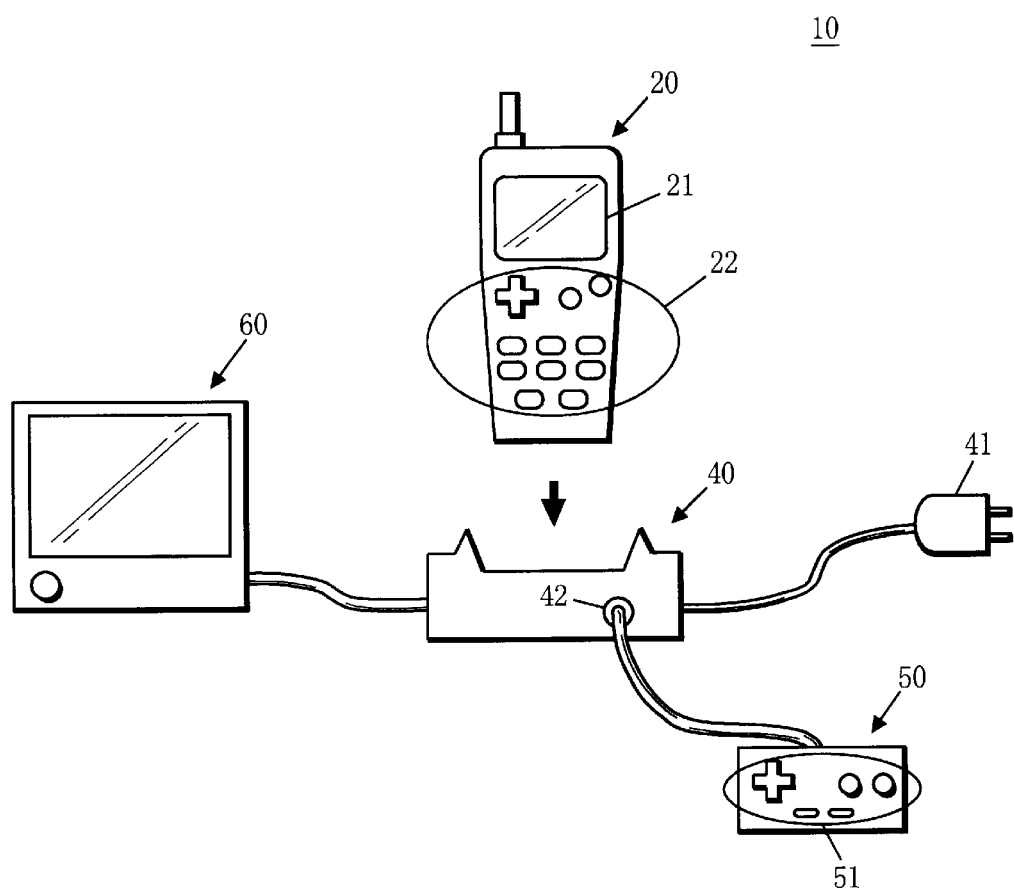
FIG. 1 is an external view of a display processing system according to a first embodiment of the present invention.

FIG. 1 is an external view of a display processing system according to a first embodiment of the present invention. In FIG. 1, a display processing system 10 includes a portable phone 20, a recharging unit with signal conversion function (hereinafter, simply referred to as "conversion adaptor") 40, a controller 50, and a television monitor 60. One of main surfaces of a housing of the portable phone 20 is provided with an LCD 21 on the upper portion and an operation part 22 on the lower portion. The operation part 22 includes a plurality of keys actuated by a user. Although omitted in the drawing, a connector or a contact is provided on the bottom of the housing of the portable phone 20. When the portable phone 20 is attached to the conversion adaptor 40, the connector or the contact electrically connects internal circuits of the portable phone 20 and the conversion adaptor 40. The conversion circuit 40 has such a structure that the portable phone 20 is engageable therein in a detachable manner. A housing of the conversion adaptor 40 is provided with a plug 41 for connection to a commercial power source and a terminal 42 for connection with the controller 50 in a detachable manner. The internal circuit of the conversion adaptor 40 will be described later in detail, by referring to FIG. 2.

The controller 50 is provided with an operation part 51 for operating the entire display processing system 10 when the portable phone 20 is attached to the conversion adaptor 40. The operation part 51 includes a plurality of keys actuated by the user. Note that the controller 50 is connected to the terminal 42 of the conversion adaptor 40 through a cable, but may be wirelessly connected thereto without cable but with a transmission medium such as radio wave or infrared ray for transmitting an operation signal. In such case, instead of the terminal 42, the controller 50 and the conversion adaptor 40 are each provided with a transmitter/receiver (not shown) for transmitting/receiving a signal by using the radio wave or light wave as the transmission medium.

Figure 2:
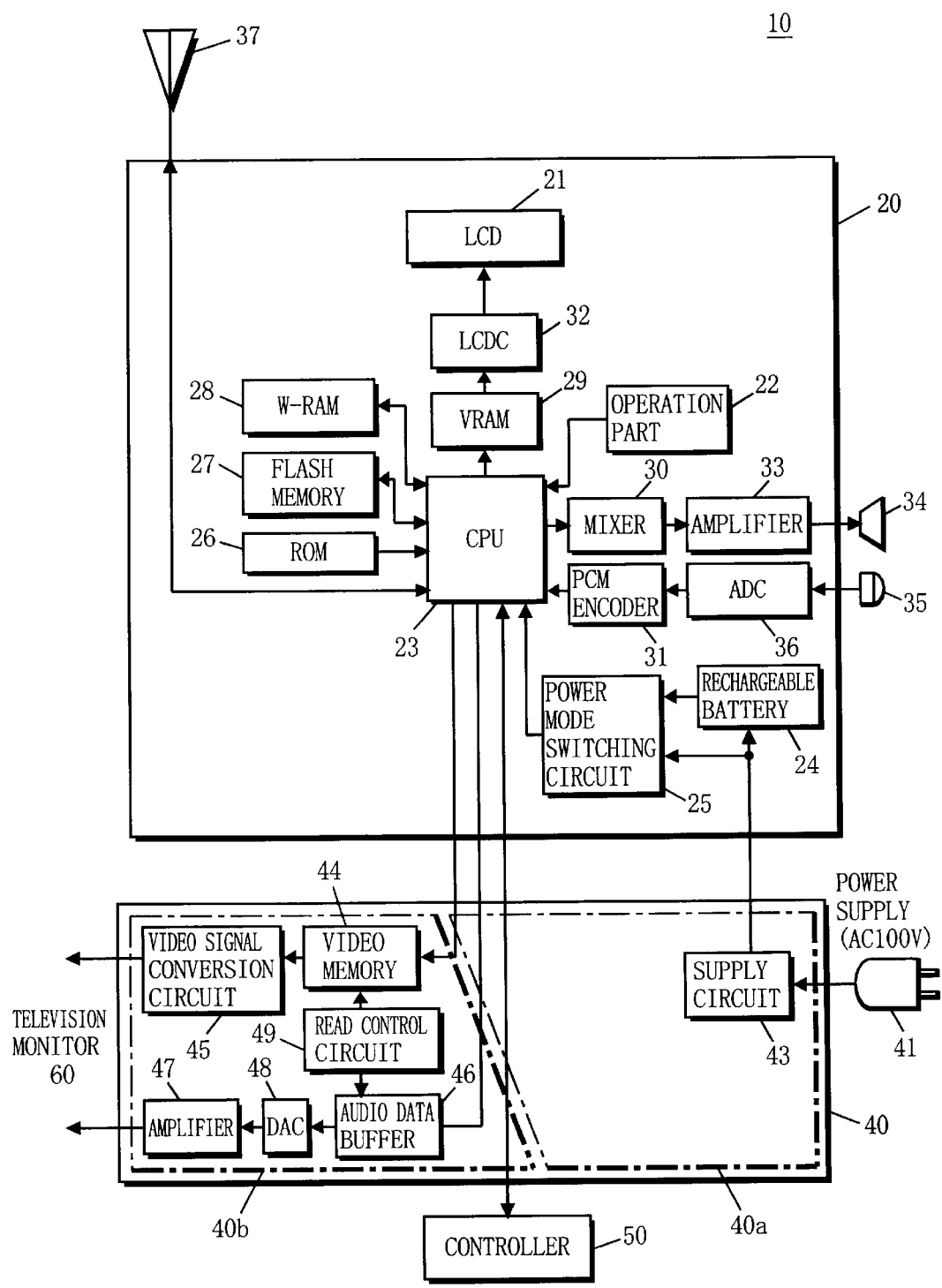
FIG. 2 is a block diagram showing the structure of a display processing system 10 according to the first embodiment of the present invention in more detail.

FIG. 2 is a block diagram showing the structure of the display processing system 10 according to the first embodiment of the present invention in more detail. In FIG. 2, the detailed structure of the portable phone 20 and the conversion adaptor 40 is shown in particular. In FIG. 2, the portable phone 20 is provided with a CPU 23 and a rechargeable battery 24. The operation part 22, an antenna part 37, a power mode switching circuit 25, a ROM 26, a flash memory 27, a working RAM 28, a VRAM 29, a mixer 30, and a PCM encoder 31 are connected to the CPU 23. The CPU 23 carries out processing based on a control program stored in the ROM 26 in response to an input from the operation part 22. The CPU 23, as required, processes image data and/or audio data stored in the flash memory 27 to generate image display data (image data for each frame) and/or audio data. The image display data generated by the CPU 23 is supplied to the VRAM 29, temporarily stored therein, and then supplied to the LCD 21 via an LCD controller 32 and displayed thereon. The audio data generated by the CPU 23 is mixed by the mixer 30, amplified by an amplifier 33, and then outputted from a speaker 34. The portable phone 20 further includes a microphone 35 for receiving voice of a user during the telephone communication. An analog voice signal from the microphone 35 is converted into a digital voice data by an analog-digital (AD) converter 36, and then converted into a PCM voice signal by the PCM encoder 31. The PCM voice signal is supplied to the CPU 23 and subjected to processing. The input voice processed by the CPU 23 is modulated with a predetermined modulating method and then transmitted from the antenna 37 as a radio wave. The radio wave is transmitted to a telephone of the party on the other end via a repeater and a central server (not shown).

The power mode switching circuit 25 detects whether the power supply currently being used is the rechargeable battery 24 or a supply circuit 43. Based on the detection, i.e., type of power supply being used, the power mode switching circuit 25 changes the operation clock for internal ICs (integrated circuits) to switch the power consumption. The ROM 26 stores programs necessary for controlling the portable phone 20 in a nonvolatile manner. The detail of the ROM 26 will be described later by referring to FIG. 3. The flash memory 27 is used as readable/writable memory (or temporal storage) for storing registered data and received data downloaded over a network (image data, audio data, game program data, etc.). The data stored in the flash memory 27 includes a phone directory for the portable phone, and game and music data distributed through communication. The working RAM 28 serves as working memory or a register for temporarily storing data to be processed by the CPU 23. The display RAM 29 temporarily stores the image display data processed by the CPU 23 for the next one frame.

The flash memory 27 can be implemented in a form of cartridge or memory stick so as to become detachable from the portable phone 20. In such case, if the flash memory 27 currently in use reaches its capacity, data can be additionally stored just by changing it to another new flash memory.

Therefore, long-term storage of the past data is possible without deletion.

The power mode switching circuit 25 determines that the portable phone 20 is not attached to the conversion adaptor 40 if there is no power supplied from the supply circuit 43 (i.e., if power is supplied only from the rechargeable battery 24). The power mode switching circuit 25 then switches an operation mode of the portable phone 20 to a power-saving mode. To be specific, the power mode switching circuit 25 changes the operation clock to that in relatively low frequency for various digital circuits including the CPU 23. Herein, an image is displayed only on the LCD 21, and therefore, the battery duration is given a higher priority than the image processing speed.

On the other hand, if detecting the power supplied from the supply circuit 43, the power mode switching circuit 25 determines that the portable phone 20 is attached to the conversion adaptor 40. The power mode switching circuit 25 then switches the operation mode of the portable phone 20 to a normal power mode. To be specific, the power mode switching circuit 25 changes the operation clock to that in higher frequency than the power-saving mode for the various digital circuits including the CPU 23. Herein, an image is displayed on the television monitor 60, and therefore, high-speed operation of the CPU 23 is necessary for generation of the image in high resolution. In this case, exhaustion of the rechargeable battery 24 needs not to be considered and high power consumption is not a problem as the power is supplied from the commercial power source. Accordingly, the image in high resolution can be displayed, which was not possible with the conventional portable phone due to the constraint on power consumption.

As described above, the power mode switching circuit 25 automatically switches between the operation modes of the various ICs depending on whether the portable phone 20 is attached to the conversion adaptor 40 or not, thereby changing the operation clock for the ICs and making the power consumption appropriate for the state of use.

The conversion adaptor 40 is provided with a recharger 40a and a video signal converter 40b. The recharger 40a includes the supply circuit 43. The supply circuit 43 includes a rectifier circuit for AC-DC conversion and a recharging control circuit for recharging the later described rechargeable battery 24 to a predetermined potential with the rectified DC power supply. The supply circuit 43 converts, for example, an AC of 100 volts supplied from an outlet (not shown) via the plug 41 into a DC and supplies the same to the rechargeable battery 24 of the portable phone 20. In this manner, the rechargeable battery 24 is recharged. Here, the recharging control circuit controls the current for recharging, as required, to avoid overcurrent.

The video signal converter 40b includes a video memory (display memory) 44, a video signal conversion circuit 45, a buffer memory for audio data (hereinafter shortened as "audio buffer") 46, an amplifier 47, a digital-analog converter (hereinafter shortened as "DAC") 48, and a read control circuit 49. The video memory 44 temporarily stores the image display data for one frame supplied from the CPU 23. The video signal conversion circuit 45 converts the image display data supplied from the video memory 44 to a video signal (NTSC, PAL, or the like), and then outputs the same to the television monitor 60. The audio buffer 46 temporarily stores the audio data supplied from the CPU 23. The DAC 48 converts the audio data (digital data) supplied from the audio buffer 46 to an analog audio signal. The converted analog signal is amplified by the amplifier 47, and then outputted from a speaker (not shown) of the television monitor 60 as audio. The read control circuit 49 controls timings for reading the image display data stored in the video memory 44 and the audio data stored in the audio buffer 46 in order to synchronize the image display data and the audio data.

Figure 3:
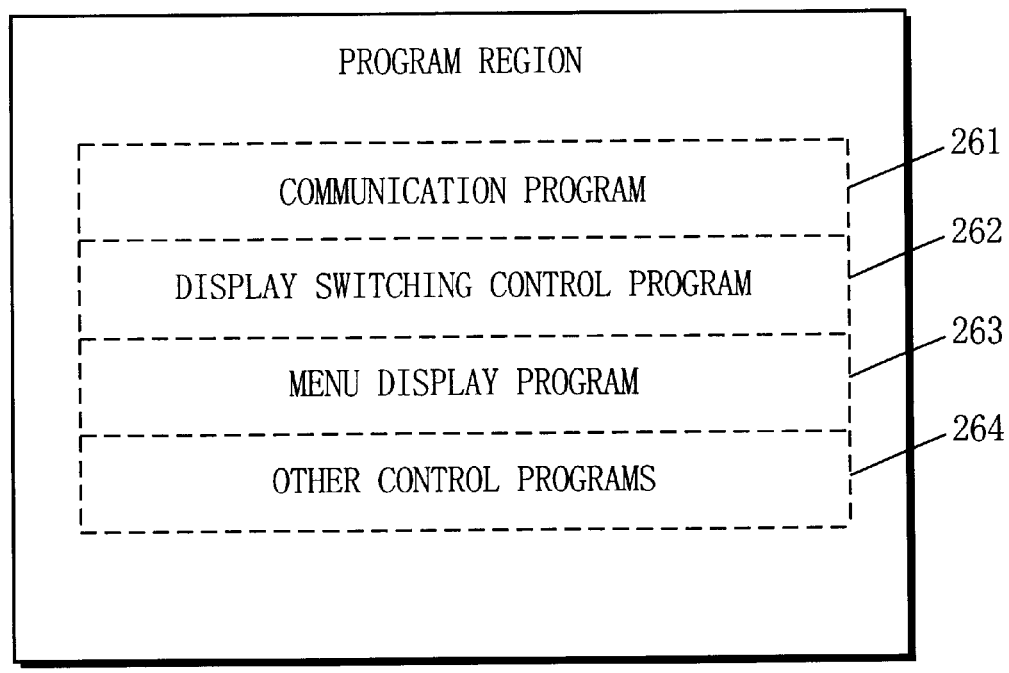
FIG. 3 is a diagram illustrating a memory map of ROM 26 in FIG. 2.

FIG. 3 is a diagram illustrating a memory map of the ROM 26. The ROM 26 is nonvolatile memory used as a program region and exemplarily stores a communication processing program 261, a display switching control program 262, a menu display program 263, and other control programs 264. The communication processing program 261 is a program necessary for phone conversation processing and data transmitting/receiving processing. The display switching control program 262 is a program for controlling a destination for the image display data and the audio data depending on a selected display mode. The menu display program 263 is a program for displaying a menu screen as will be shown later in FIG. 5.

Next, specific functions of the CPU 23 are described. Every time the antenna part 37 receives an incoming call or data, the CPU 23 processes received data in accordance with the communication processing program 261, and if necessary, making the flash memory 27 store the received data or the registered data. The CPU 23 also processes the data stored in the flash memory 27 to generate the image display data and/or audio data.

Here, when the portable phone 20 is not attached (or connected) to the conversion adaptor 40, the CPU 23 supplies the generated image display data to the display RAM 29 for temporary storage therein. The image display data stored in the display RAM 29 is supplied to the LCD 21 via the LCD controller 32 and then displayed. The CPU 23 supplies the generated audio data to the mixer 30. The mixer 30 converts the received audio data into the audio signal. The audio signal outputted from the mixer 30 is amplified by the amplifier 33 and then supplied to the speaker 34. The speaker 34 outputs audio based on the audio signal.

On the other hand, when the portable phone 20 is attached to the conversion adaptor 40 and also electrically connected thereto, if a user actuates the controller 50 to select a first display mode, the CPU 23 stops supplying the generated image display data to the display RAM 29, and instead, supplies the same to the video memory 44. The supplied data is temporarily stored therein. The image display data stored in the video memory 44 is read by the read control circuit 49 on predetermined timing, and then converted into a video signal by the video signal conversion circuit 45. The video signal is thereafter supplied to the television monitor 60, and thereon, displayed as one-frame image. The CPU 23 also stops supplying the generated audio data to the mixer 30, and instead, supplies the same to the audio buffer 46. The supplied audio data is temporarily stored therein. The audio data stored in the audio buffer 46 is read by the read control circuit 49 on predetermined timing, and then converted into an audio signal by the DAC 48. The audio signal is thereafter supplied to the speaker of the television monitor 60 (not shown), and therefrom, outputted as audio.

When the portable phone 20 is attached to the conversion adaptor 40 and also electrically connected thereto, if the user actuates the controller 50 to select a second display mode, the CPU 23 supplies the generated image data to both of the display RAM 29 and the video memory 44. Further, the CPU 23 supplies the generated audio data to both of the mixer 30 and the audio buffer 46. In this case, the image is displayed on both of the LCD 21 and the television monitor 60. The audio is outputted from both of the speaker 34 of the portable phone 20 and the speaker of the television monitor 60.

Further, the CPU 23 carries out data processing that is made in response to the operation signal supplied from the controller 50 or the operation part 22 so as to make changes to the image displayed on the television monitor 60 (in the second display mode, on the television monitor 60 and the LCD 21) and output audio corresponding to the image, as required. Consequently, when the portable phone 20 is connected to the conversion adaptor 40, the user actuates the controller 50 according to the image displayed on the television monitor 60 and/or the audio outputted from the speaker thereof, thereby indirectly operating the portable phone 20.

The CPU 23 may switch the output of the image and audio in a predetermined manner at the time when the portable phone 20 is connected to the conversion adaptor 40, without accepting the user's selection. In such case, the image is displayed on both of the LCD 21 and the television monitor 60 or just on the television monitor 60. The audio is outputted from both of the speaker 34 of the portable phone 20 and the speaker of the television monitor 60 or just from the speaker of the television monitor 60.

Further, the controller 50 may be incorporated with a vibration motor. The CPU 23 may supply vibration control data to the controller 50 at the receipt of an incoming call or depending on the change of the image displayed on the television monitor 60 in order to vibrate the controller 50.

Still further, the portable phone 20 can download game data received through the antenna part 37 (herein, the game data is stored in the flash memory 27). When the execution of the game program stored in the flash memory 27 is instructed through the actuation of the controller 50, for example, the CPU 23 generates the image display data for the game based on such game program. The generated image display data is stored in the video memory 44. The image display data for the game is converted into a video signal by the video conversion circuit 45, and then outputted to the television monitor 60. Accordingly, a player watches a game screen displayed on the television monitor 60, and according thereto, actuates the controller 50. In this manner, the player can play the game based on the game program downloaded in the portable phone 20. Of course, the player also can play the game on the LCD 21 as in the past.

If the portable phone 20 receives an incoming call during the game processing carried out by the CPU 23, a message or an icon notifying the user of the incoming call may be displayed on a part of the screen on the television monitor 60 or on the LCD 21. In such case, the CPU 23 carries out the game processing and the incoming call processing in a time-division manner. In response to this, the user actuates the controller 50 to select either to answer the incoming call or to hold the incoming call processing. If the user selects to answer the incoming call, the CPU 23 suspends the game processing and carries out the phone conversation processing. The suspended game processing is continued after the phone conversation processing is complete.

On the other hand, if the user selects to hold the incoming call processing, the CPU 23 puts the incoming call processing on hold and continues the game until a scene at which any problem is not caused by suspension (an appropriate scene to leave off). Or, the CPU 23 transmits a code indicating the status that the user is unable to talk over the phone and continues the game processing.

Figure 4:
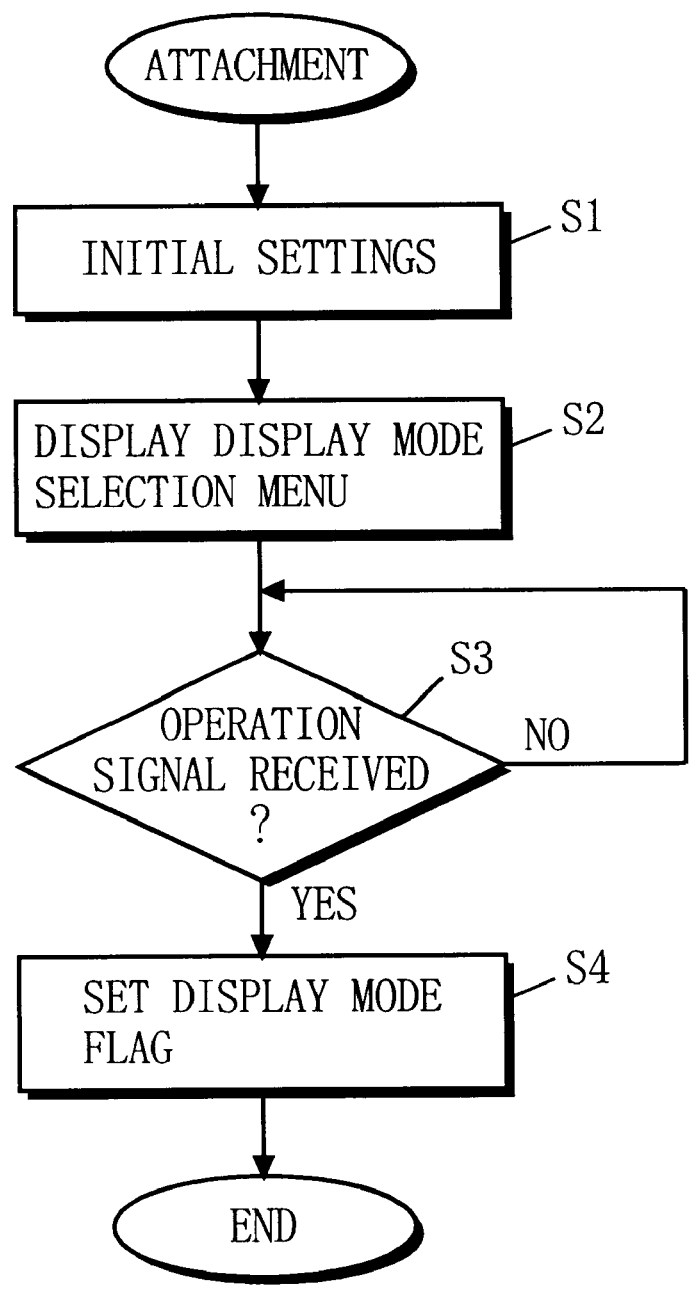
FIG. 4 is a flowchart for explaining an initial operation firstly carried out by a CPU 23 when a portable phone 20 is attached to a conversion adaptor 40 in the first embodiment.

FIG. 4 is a flowchart for explaining an initial operation firstly carried out by the CPU 23 when the portable phone 20 is attached to the conversion adaptor 40. The determination whether or not the portable phone 20 is attached to the conversion adaptor 40 is made based on whether or not the portable phone 20 is being supplied with the power from the supply circuit 43. Alternatively, determination may be made based on a key operation signal received by the CPU 23. The key operation signal corresponds to a predetermined key actuation on the controller 50 and such key actuation is made after the portable phone 20 being attached to the conversion adaptor 40.

If it is determined that the portable phone 20 is attached to the conversion adaptor 40, the CPU 23 firstly carries out initial settings (step S1). As the initial settings, memory regions of the video memory 44 and the audio buffer 46, for example, are reset (i.e., initial data is written therein or all data is cleared). Next, in accordance with the menu display program 263 shown in FIG. 3, the CPU 23 makes the display mode selection menu exemplarily shown in FIG. 5 displayed on the television monitor 60 (step S2). To be more specific, the CPU 23 generates image display data for the display mode selection menu shown in FIG. 5 and supplies the generated image display data to the video memory 44. The image display data is temporarily stored therein. The image display data stored in the video memory 44 is read by the read control circuit 49 on predetermined timing, and then converted into a video signal by the video signal conversion circuit 45. Thereafter, the video signal is supplied to the television monitor 60 and displayed thereon as one frame image.

Figure 5:
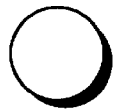
FIG. 5 is a diagram showing a display mode selection menu displayed on a television monitor 60 in the initial operation.

According to the display mode selection menu on the television monitor 60, the user actuates the controller 50 to select a predetermined display mode from among options included in the display mode selection menu. In FIG. 5, an option 1 represents the first display mode which allows image display only on the television monitor 60, and an option 2 represents the second display mode which allows image display on both of the television monitor 60 and the LCD 21 of the portable phone 20. At this point of time, upon such actuation of the controller 50 by the user, a corresponding operation signal is transmitted to the CPU 23. If the CPU 23 determines that the operation signal is received (step S3), sets a display mode flag (step S4). The display mode flag is provided as one of flag regions of the working RAM 28, for example, and is set to 0 at the default. As will be described later, if the display mode flag is set to 0, the image is displayed only on the LCD 21 of the portable phone 20 (the status is hereinafter referred to as default display mode). The display mode flag is set to 1 if the option 1 is selected in the above described display mode selection menu, and set to 2 if the option 2 is selected. The CPU 23 then terminates the initial operation.

Figure 6:
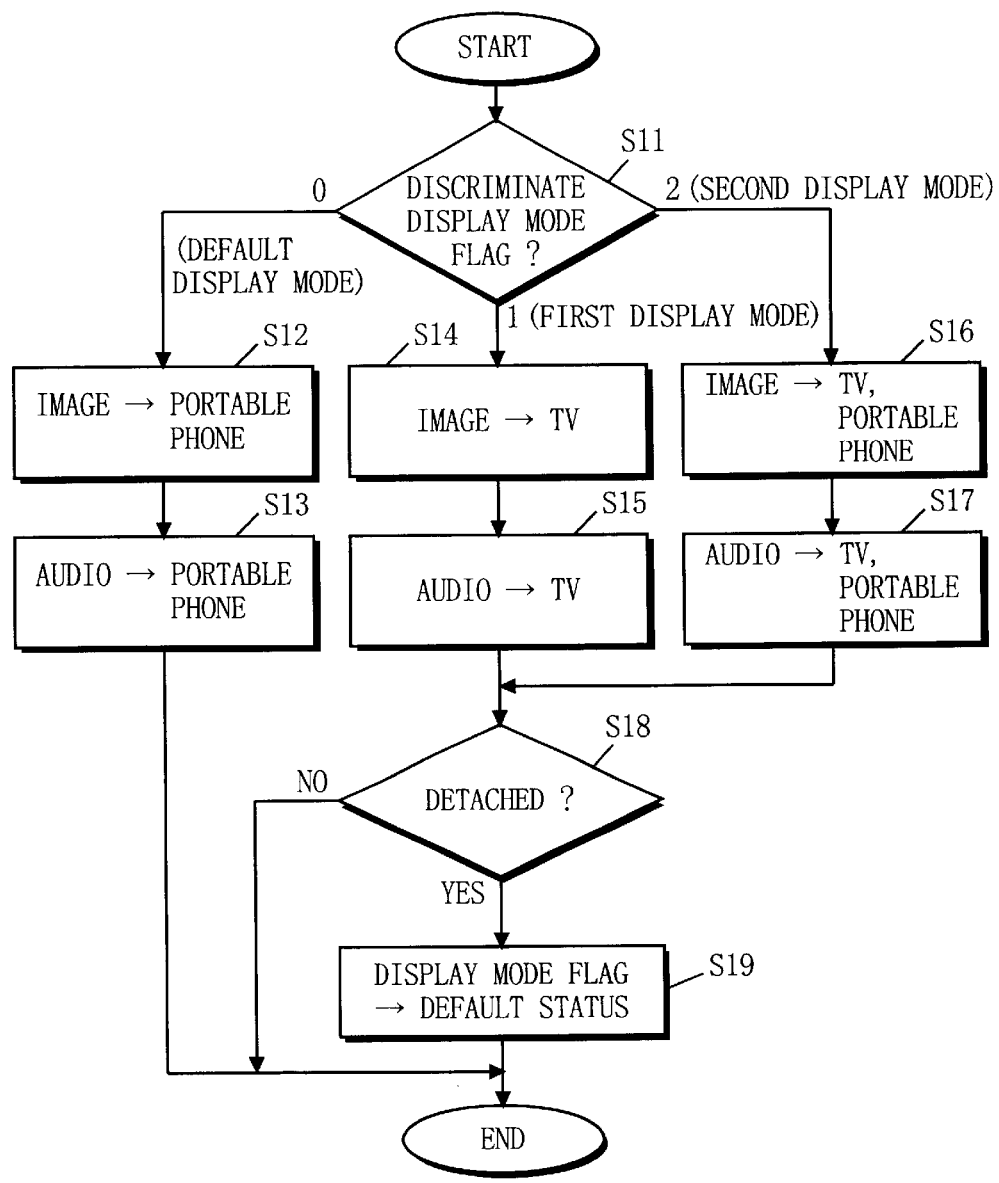
FIG. 6 is a flowchart for explaining a display switching operation of the CPU 23 based on a display switching control program 262 in FIG. 3.

FIG. 6 is a flowchart for explaining a display switching operation of the CPU 23 based on the display switching control program 262 in FIG. 3. The display switching operation is handled as an interrupt on a frame cycle basis. The CPU 23 first discriminates the setting of the display mode flag varying among 0, 1, and 2, i.e., among the default display mode, the first display mode, and the second display mode (step S11).

At this point of time, if the setting of the display mode flag is 0, meaning the default display mode, the CPU 23 supplies the generated image display data to the LCD 21 via the display RAM 29 and the LCD controller 32 so that the image is displayed thereon (step S12). The CPU 23 also supplies the generated audio data to the speaker 34 via the mixer 30 and the amplifier 33 so that the audio is outputted therefrom (step S13). Such default display mode is typical when the portable phone 20 is not attached to the conversion adaptor 40. The CPU thereafter terminates the display switching operation in FIG. 6.

If the setting of the display mode flag is 1, meaning the first display mode, the CPU 23 supplies the generated image display data to the television monitor 60 via the video memory 44 and the video signal conversion circuit 45 so that the image is displayed thereon (step S14). The CPU 23 also supplies the generated audio data to the television monitor 60 via the audio data buffer 46, the DAC 48, and the amplifier 47 so that the audio is outputted therefrom (step S15). The first display mode is carried out when the portable phone 20 is attached to the conversion adaptor 40 and the option 1 is selected in the display mode selection menu in FIG. 5.

If the setting of the display mode flag is 2, meaning the second display mode, the CPU 23 supplies the generated image display data to both of the LCD 21 and the television monitor 60 so that the image is displayed thereon (step S16). The CPU 23 also supplies the generated audio data to both of the speaker 34 and the television monitor 60 so that the audio is outputted therefrom (step S17). The second display mode is carried out when the portable phone 20 is attached to the conversion adaptor 40 and the option 2 is selected in the display mode selection menu in FIG. 5.

After the above described step S15 or S17, the CPU 23 determines whether the portable phone 20 has been detached from the conversion adaptor 40 or not (step S18). If the portable phone 20 has been detached from the conversion adaptor 40, the CPU 23 sets the display mode flag to the default value 0. Thereafter, the CPU 23 terminates the display switching operation in FIG. 6. On the other hand, if the portable phone 20 has not been detached from the conversion adaptor 40, the CPU 23 terminates the display switching operation in FIG. 6.

Second Embodiment

Figure 7:
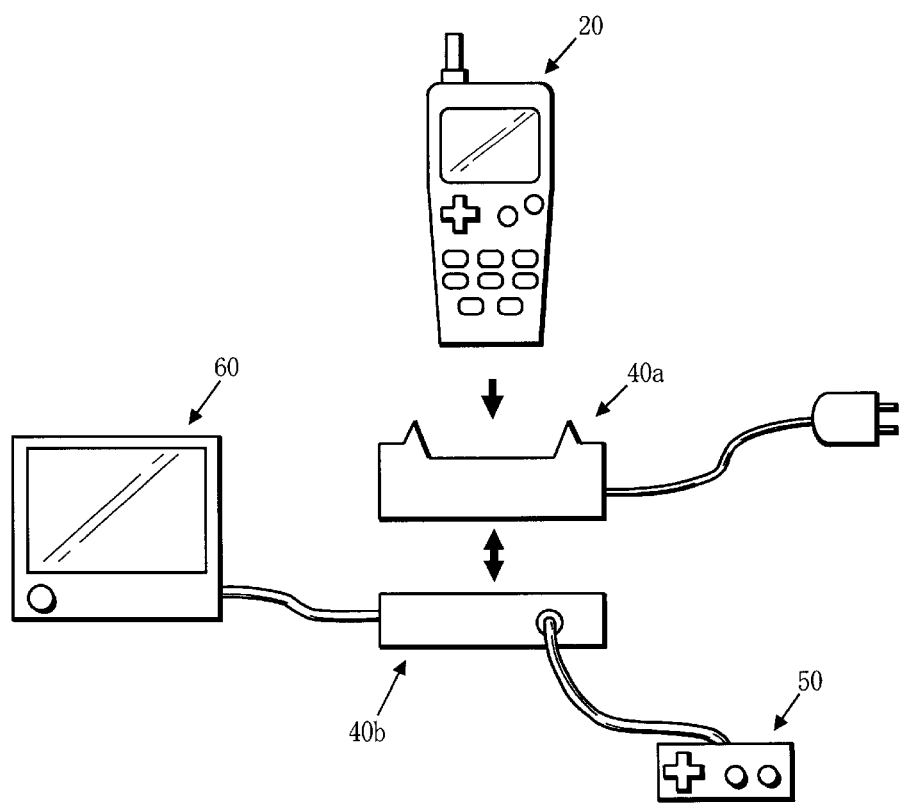
FIG. 7 is an external view of a display processing system according to a second embodiment of the present invention.

FIG. 7 is an external view of a display processing system 100 according to a second embodiment of the present invention. The embodiment of FIG. 7 differs from that of FIG. 1 in that the conversion adaptor 40 in FIG. 1 is structured separatable into the recharger 40a without video conversion function and the video signal converter 40b. In other words, the recharger 40a includes only the supply circuit 43 in its housing. On the other hand, the video signal converter 40b is structured in a housing different from that of the recharger 40a and incorporates the video memory 44, the video signal conversion circuit 45, the buffer for audio data 46, the amplifier 47, the DAC 48, and the read control circuit 49. The recharger 40a and the video signal converter 40b are each provided with a connector (not shown) and are structured in a detachable and electrically disconnectable manner from each other.

With such structure, the user can first buy the recharger 40a only, and then buy the video signal converter 40b afterwards, if necessary. The user, therefore, can select at will whether to buy only the recharger 40 and add the video signal converter 40b lateror to buy the both at the same time. The recharger 40a is necessiated by the portable phone even in a standalone use thereof. Therefore, by utilizing any recharger 40a available in the market, the total system cost can be suppressed, thereby reducing the user's expense.

Third Embodiment

FIG. 8 is an external view of a display processing system 200 according to a third embodiment of the present invention. The embodiment of FIG. 8 is so structured that the television monitor 60 incorporates a circuitry of the video signal converter 40b included in the conversion adaptor 40 of the embodiment in FIG. 1. Further, the recharger 40a is externally attached on the upper end of the side of the television monitor 60, and the controller 50 is connected to the television monitor 60. That is to say, the recharger 40a is structured only by the supply circuit 43, and the video signal converter 40b incorporated in the television monitor 60 is structured by the video memory 44, the video signal conversion circuit 45, the buffer for audio data 46, the amplifier 47, the DAC 48, and the read control circuit 49.

FIG. 9 is a conceptual diagram showing signal flow in the embodiment of FIG. 8. When the portable phone 20 is attached to the recharger 40a, power is supplied from an outlet connected to the television monitor 60 to the rechargeable battery 24 of the portable phone 20 via the supply circuit 43 included in the recharger 40a. The operation signal from the controller 50 is supplied to the CPU 23 of the portable phone 20 via the video signal converter 40b in the television monitor 60. In response to the operation signal, the CPU 23 supplies the image display data and the audio data to the video memory 44 and the buffer for audio data 46 included in the video signal converter 40b, respectively. The image display data supplied to the video memory 44 is converted into a video signal by the video signal conversion circuit 45. The video signal is supplied to a CRT of the television monitor 60 and displayed on the monitor screen. The audio data supplied to the audio buffer 46 is converted into an analog signal by the DAC 48. The audio signal is amplified by the amplifier 47 and outputted as audio from the speaker of the television monitor 60.

Note that, in the embodiment of FIG. 8, the controller 50 is connected to the television monitor 60 through a cable, but may be connected thereto through wireless communication for signal transmission. In such case, the controller 50 and the television monitor 60 are each incorporated with a transmitter/receiver (not shown) for wireless communication. Further, the controller 50 may be provided with functions for operating the television monitor 60 (similar to functions of a remote controller such as channel switching and volume control). In this manner, the controller 50 is able to operate both of the portable phone 20 and the television monitor 60.

Fourth Embodiment

Figure 10:
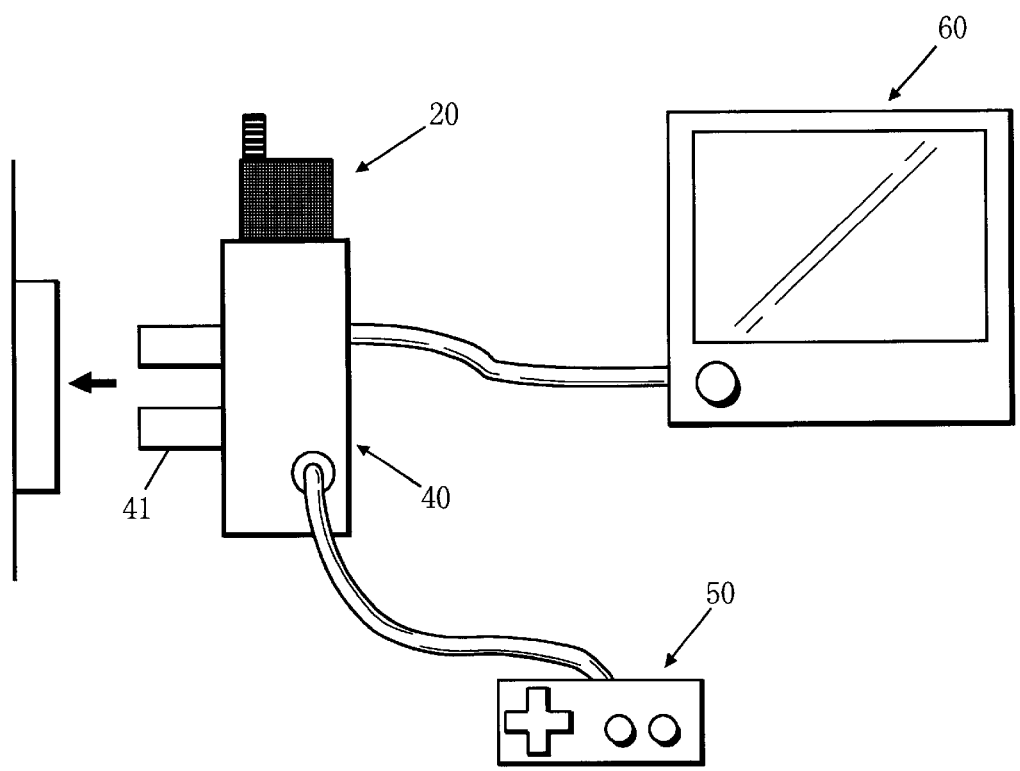
FIG. 10 is an external view of a display processing system according to a fourth embodiment of the present invention.

FIG. 10 is an external view of a display processing system 300 according to a fourth embodiment of the present invention. In the embodiment of FIG. 10, the plug 41 in the embodiment of FIG.1 is integrally formed on the side (or the bottom) of the conversion adaptor 40. The plug 41 may be contained in the conversion adaptor 40 when not being used.

Fifth Embodiment

Figure 11:
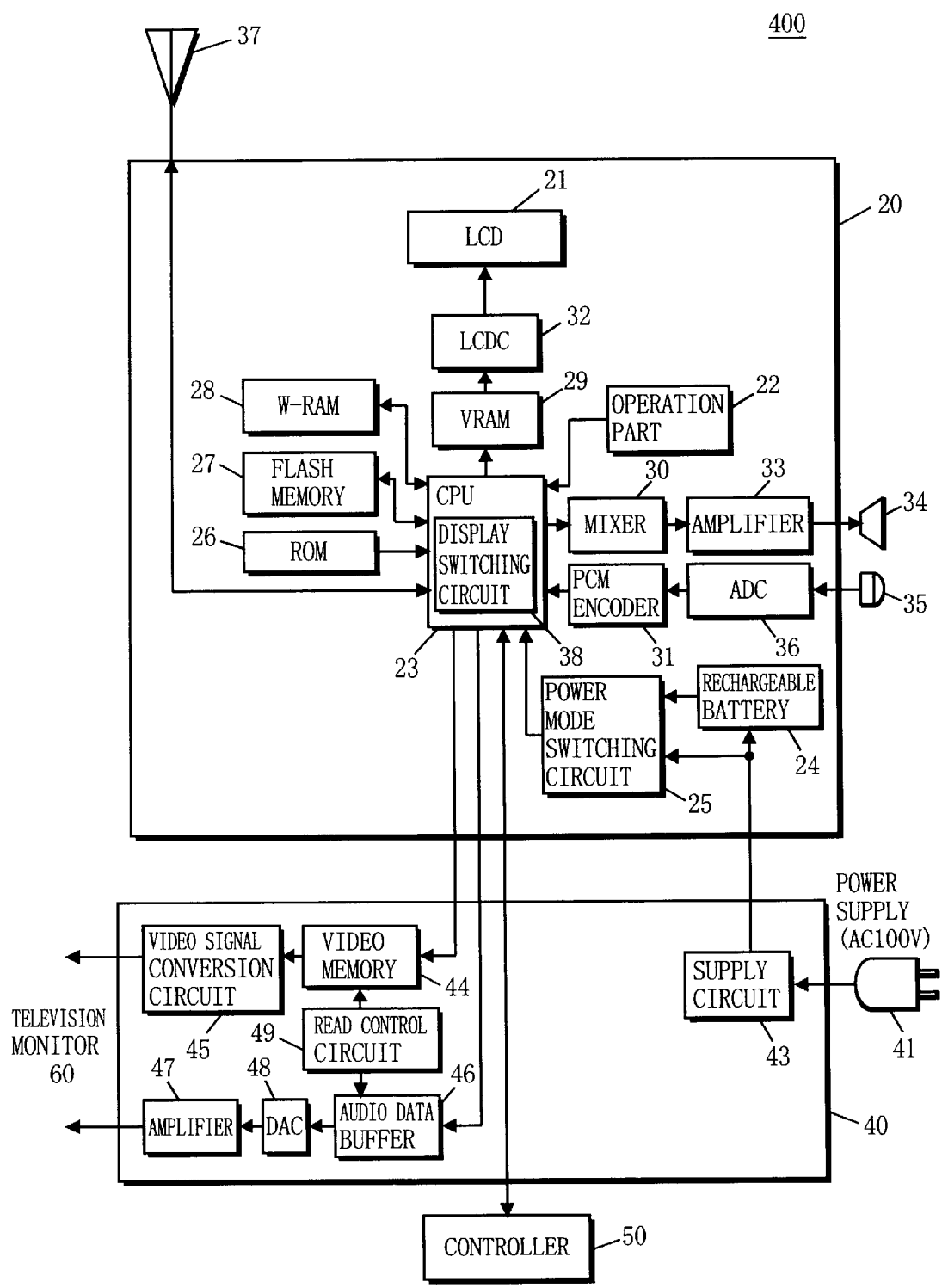
FIG. 11 is a block diagram of a display processing system according to a fifth embodiment of the present invention.

FIG. 11 is a block diagram of a display processing system 400 according to a fifth embodiment of the present invention. In the embodiment of FIG. 11, a chip on the CPU 23 in the embodiment of FIG. 2 is additionally provided with a display switching circuit 38 so that the switching between display by the LCD 21 and display by the television monitor 60 is performed in a hardware manner. Accordingly, when the portable phone 20 is not connected to the conversion adaptor 40, the display switching circuit 38 supplies the image display data and the audio data, generated by the CPU 23, to the display RAM 29 and the mixer 30, respectively. On the other hand, when the portable phone 20 is connected to the conversion adaptor 40, if a display switching signal is supplied from the controller 50, the display switching circuit 38 supplies the image display data and the audio data respectively to the video memory 44 and buffer for audio data 46 in the conversion adaptor 40. Note that the display switching circuit 38 may be structured by an external IC separately from the CPU 23.

Sixth Embodiment

Figure 12:
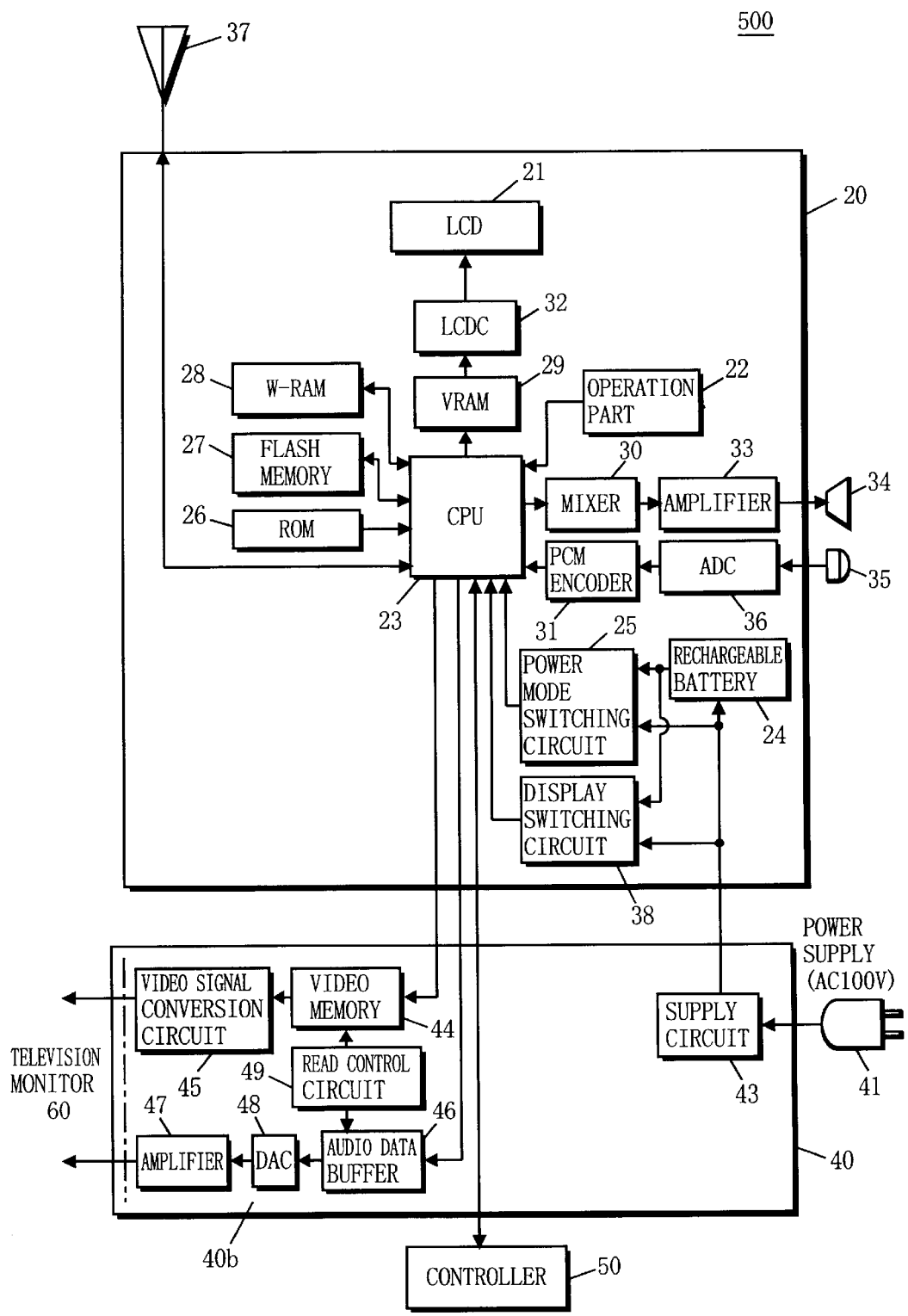
FIG. 12 is a block diagram of a display processing system according to a sixth embodiment of the present invention.

FIG. 12 is a block diagram of a display processing system 500 according to a sixth embodiment of the present invention. In the embodiment of FIG. 12, the portable phone 20 in FIG. 2 is further provided with the display switching circuit 38 that detects power supply and automatically generates a switching signal. Accordingly, the display switching circuit 38 detects whether the power is supplied from the rechargeable battery 24 or the supply circuit 43, and based on the detection, supplies the switching signal to the CPU 23. To be specific, when detecting that the power is supplied from the rechargeable battery 24, the display switching circuit 38 determines that the portable phone 20 is used without being attached to the conversion adaptor 40. The display switching circuit 38 then supplies a switching signal to the CPU 23. The switching signal instructs the CPU 23 to supply the image display data and the audio data to the display RAM 29 and the mixer 30, respectively. On the other hand, when detecting that the power is supplied from the supply circuit 43, the display switching circuit 38 determines that the portable phone 20 is being attached to the conversion adaptor 40 (under recharging state). The display switching circuit 38 then generates and supplies a switching signal to the CPU 23. The switching signal instructs the CPU 23 to supply the image display data and the audio data to the video memory 44 and the audio buffer 46, respectively. As such, with the structure capable of display switching based on the detected type of power supply, such display switching is automatically performed by detecting an attachment of the portable phone 20 to the conversion adaptor 40. Accordingly, it is possible to supply the image display data to the television monitor 60 only when the portable phone 20 is attached to the conversion adaptor 40.

Seventh Embodiment

Figure 13:
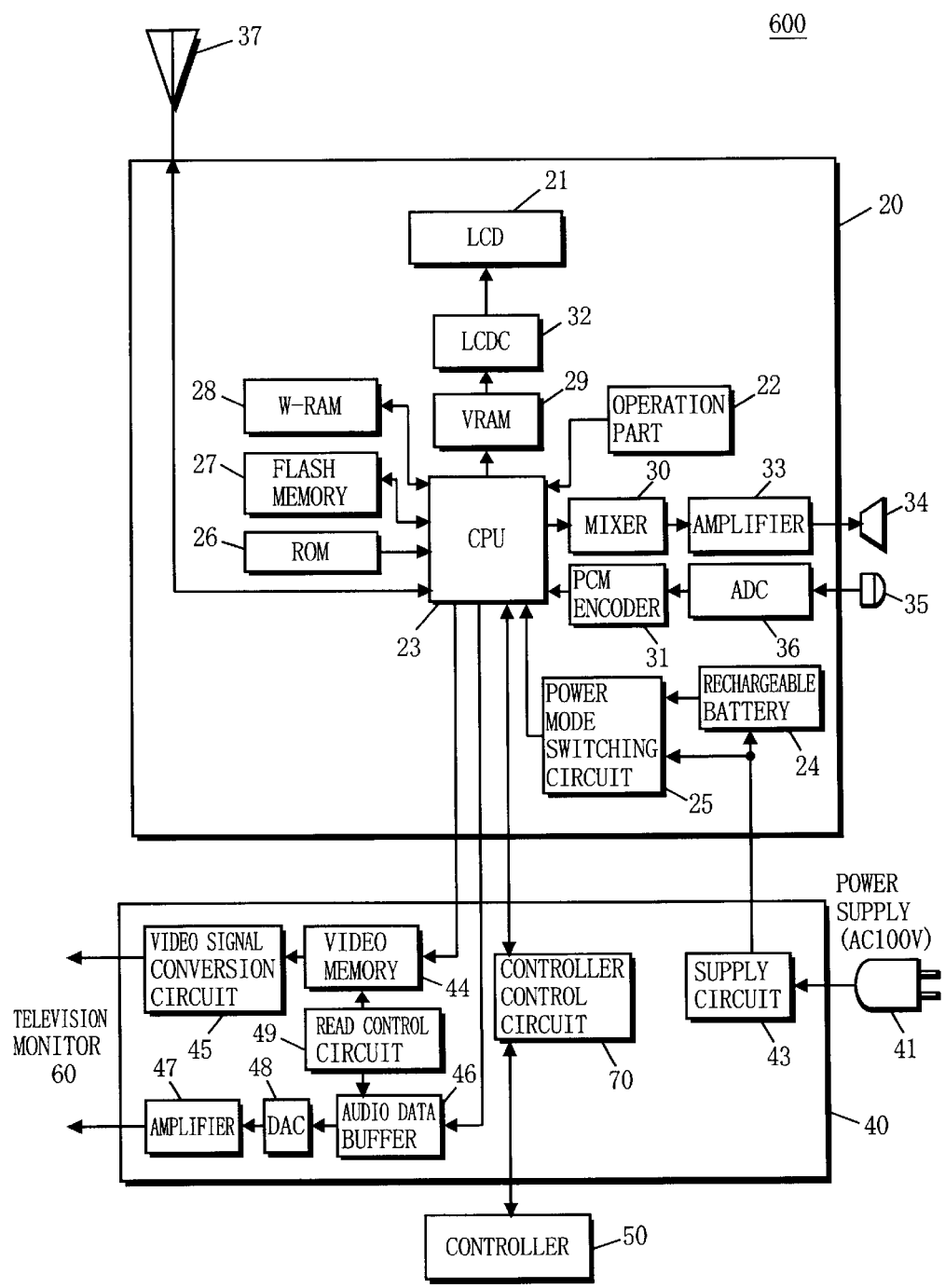
FIG. 13 is a block diagram of a display processing system according to a seventh embodiment of the present invention.

FIG. 13 is a block diagram of a display processing system 600 according to a seventh embodiment of the present invention. In the embodiment of FIG. 13, the conversion adaptor 40 in the embodiment of FIG. 2 is further provided with a controller control circuit 70 for controlling the controller 50. When receiving, from the controller 50, an input of an operation signal instructing display switching to the television monitor 60, the controller control circuit 70 generates and supplies a control signal to the CPU 23. The control signal instructs the CPU 23 to supply the image display data and the audio data to the video memory 44 and the audio buffer 46, respectively. Further, based on an operation signal from the controller 50, the controller control circuit 70 transmits, to the CPU 23, a control signal for changing the image or audio.

At the same time, the controller control circuit 70 receives a control signal from the CPU 23 and then brings the controller 50 into various operations. For example, when the CPU 23 supplies, to the controller control circuit 70, the control signal for generating vibration in relation to the image to be displayed, the controller control circuit 70 sets a vibration pattern (e.g., intensity and/or interval of vibration), and based thereon, controls the operation of the vibration motor (not shown) provided in the controller 50.

In each of the above embodiments, described was the case where the image on the portable phone is displayed on the television monitor 60. The technical principle of the present invention is not limited to such case, and it is needless to say that the game image based on game data, or various data (news, weather report, fortune-telling, road map, and other various homepage information) received from the information providing server by the portable phone 20 may be displayed.

Further, in each of the above embodiments, described was the case where the television monitor 60 displays the image on the portable phone. The television monitor 60, however, is not the only one, but any type of large screen display such as a CRT display can be used.

While the invention has been described in detail, the foregoing description is in all aspects illustrative and not restrictive. It is understood that numerous other modifications and variations can be devised without departing from the scope of the invention.

What is claimed is:

1. A display processing system processing image data and displaying an image, comprising:
a portable terminal having an external communication function and equipped with a liquid crystal display;
a television monitor; and
a conversion adaptor capable of attaching said portable terminal thereto in a detachable manner, and connected to said television monitor, wherein
said portable terminal includes:
image data storage for storing image data obtained through communication and/or generated internally;
program data storage for storing program data;
a processor for carrying out predetermined processings in accordance with the program data stored in said program data storage; and
a liquid crystal display driver for driving, for display, said liquid crystal display,
said conversion adaptor including a video signal converter,
said processor, in accordance with said program data, carries out processing for processing the image data stored in said image data storage to generate image display data for each frame and switching a destination for supplying the generated image display data,
said liquid crystal display driver drives said liquid crystal display for display based on said image display data supplied from said processor,
said video signal converter converts, when said portable terminal is attached to said conversion adaptor, the image display data supplied from said processor into a video signal and outputs the video signal to said television monitor,
said television monitor displays an image in accordance with said video signal supplied from said video signal converter, and
wherein
said conversion adaptor further includes:
first temporary storage for temporarily storing the image display data supplied from said processor; and
a read controller for controlling timing for reading the image display data stored in said first temporary storage and outputting the image display data to said signal converter, wherein
said portable terminal further includes audio data storage for storing audio data obtained through communication and/or generated internally, and said processor, in accordance with said program data, carries out processing for reading the audio data stored in said audio data storage in relation to timing for generating said image display data and switching a destination for supplying the read audio data in correspondence with the destination for said image display data.

2. The display processing system according to claim 1, wherein said conversion adaptor further includes a recharger for recharging said portable terminal.

3. The display processing system according to claim 2, wherein said conversion adaptor further includes:
- a first housing accommodating at least said video signal converter; and
- a second housing accommodating at least said recharger, and said first and second housings are structured in a detachable manner from each other.

4. The display processing system according to claim 1, wherein said processor supplies the image display data to said liquid crystal display driver when said portable terminal is not attached to said conversion adaptor, and supplies the image display data to at least said conversion adaptor when said portable terminal is attached to said conversion adaptor.

5. The display processing system according to claim 1, wherein said portable terminal further includes:
- a speaker; and
- speaker driver for driving said speaker based on the audio data supplied from said processor, said conversion adaptor further includes:
- first temporary storage for temporarily storing the image display data supplied from said processor;
- second temporary storage for temporarily storing the audio data supplied from said processor;
- audio signal converter for converting the audio data stored in said second temporary storage into an audio signal and outputting the audio signal to said television monitor; and
- a read controller for reading the image data stored in said first temporary storage and outputting the image data to said video signal converter, and reading the audio data stored in said second temporary storage and outputting the audio data to said audio signal converter, and said read controller controls timing for reading the image display data from said first temporary storage and timing for reading the audio data from said second temporary storage so as to synchronize timing thereof.

6. The display processing system according to claim 1, wherein said image data storage and said audio data storage each include readable/writable memory capable of reading and writing the image data and the audio data and are structured in a detachable manner from a body of the portable terminal.

7. The display processing system according to claim 1, wherein said conversion adaptor is relationally connected with a first operator, and said processor carries out processing made in response to an operation signal from said first operator.

8. The display processing system according to claim 7, wherein said first operator is connected to said conversion adaptor wirelessly.

9. The display processing system according to claim 7, wherein said portable terminal further comprises a second operator that is integrally structured to a body of the portable terminal, and said processor carries out processing made in response to an operation signal from said second operator in addition to the operation signal from said first operator.

10. The display processing system according to claim 7, wherein said processor transmits a control signal to said first operator.

11. A portable terminal detachable from a conversion adaptor connected to a television monitor and having an external communication function, comprising:

a liquid crystal display;

image data storage for storing image data obtained through communication and/or generated internally;

program data storage for storing program data;

a processor for carrying out predetermined processings in accordance with the program data stored in said program data storage; and a liquid crystal display driver for driving, for display, said liquid crystal display, wherein said processor, in accordance with said program data, carries out processing for processing the image data stored in said image data storage to generate image display data for each frame and switching a destination for supplying the generated image display data between said liquid crystal display driver and said conversion adaptor, said liquid crystal display displays an image based on said image display data when the image display data is supplied to said liquid crystal display driver, said television monitor displays the image when said image display data is supplied to said conversion adaptor, wherein said processor, in accordance with said program data, supplies said image display data to said liquid crystal display driver when the portable terminal is not being attached to said conversion adaptor, and supplies said image display data to said conversion adaptor when being attached thereto, and said portable terminal further comprising audio data storage for storing audio data obtained through communication and/or generated internally, wherein said processor, in accordance with said program data, carries out processing for reading the audio data stored in said audio data storage in relation to timing for generating said image display data and switching a destination for supplying the read audio data in correspondence with the destination for said image display data.

12. The portable terminal according to claim 11, wherein said image data storage and said audio data storage each include readable/writable memory capable of reading and writing the image data and the audio data, and are structured in a detachable manner from a body of the portable terminal.

13. A conversion adaptor connected to a television monitor and capable of attaching a portable terminal thereto in a detachable manner, comprising a video signal converter for converting image display data for each frame supplied from said portable terminal into a video signal and outputting the video signal to said television monitor, first temporary storage for temporarily storing the image display data supplied from said portable terminal; and a read controller for controlling timing for reading the image display data stored in said first temporary storage and outputting the image display data to said signal converter;

second temporary storage for temporarily storing audio data supplied from said portable terminal;

an audio signal converter for converting the audio data stored in said second temporary storage into an audio signal and outputting the audio signal to said television monitor; and a read controller for reading the image data stored in said first temporary storage and outputting the image display data to said video signal converter, and reading the audio data stored in said second temporary storage and outputting the audio data to said audio signal converter, wherein said read controller controls timing for reading the image display data from said first temporary storage and timing for reading the audio data from said second temporary storage so as to synchronize the timing thereof.

14. The conversion adaptor according to claim 13, further comprising a recharger for recharging said portable terminal.

15. The conversion adaptor according to claim 13, further comprising an operator for supplying an operation signal to said portable terminal.

16. A display processing system processing image data and displaying an image, comprising:

a portable terminal having an external communication function and equipped with a liquid crystal display;

a television monitor; and a conversion adaptor capable of attaching said portable terminal thereto in a detachable manner, and connected to said television monitor, wherein said portable terminal includes:
image data storage for storing image data obtained through communication and/or generated internally;
program data storage for storing program data;
a processor for carrying out predetermined processings in accordance with the program data stored in said program data storage; and
a liquid crystal display driver for driving, for display, said liquid crystal display, said conversion adaptor including a video signal converter, said processor, in accordance with said program data, carries out processing for processing the image data stored in said image data storage to generate image display data for each frame and switching a destination for supplying the generated image display data, said liquid crystal display driver drives said liquid crystal display for display based on said image display data supplied from said processor, said video signal converter converts, when said portable terminal is attached to said conversion adaptor, the image display data supplied from said processor into a video signal and outputs the video signal to said television monitor, said television monitor displays an image in accordance with said video signal supplied from said video signal converter, and wherein said conversion adaptor further includes:
first temporary storage for temporarily storing the image display data supplied from said processor; and a read controller for controlling timing for reading the image display data stored in said first temporary storage and outputting the image display data to said signal converter, wherein said conversion adaptor is relationally connected with a first operator, and said processor carries out processing made in response to an operation signal from said first operator, wherein said portable terminal further comprises a second operator that is integrally structured to a body of the portable terminal, and said processor carries out processing made in response to an operation signal from said second operator in addition to the operation signal from said first operator.

17. A display processing system processing image data and displaying an image, comprising:

a portable terminal having an external communication function and equipped with a liquid crystal display;

a television monitor; and a conversion adaptor capable of attaching said portable terminal thereto in a detachable manner, and connected to said television monitor, wherein said portable terminal includes:
image data storage for storing image data obtained through communication and/or generated internally;
program data storage for storing program data;
a processor for carrying out predetermined processings in accordance with the program data stored in said program data storage; and
a liquid crystal display driver for driving, for display, said liquid crystal display, said conversion adaptor including a video signal converter, said processor, in accordance with said program data, carries out processing for processing the image data stored in said image data storage to generate image display data for each frame and switching a destination for supplying the generated image display data, said liquid crystal display driver drives said liquid crystal display for display based on said image display data supplied from said processor, said video signal converter converts, when said portable terminal is attached to said conversion adaptor, the image display data supplied from said processor into a video signal and outputs the video signal to said television monitor, said television monitor displays an image in accordance with said video signal supplied from said video signal converter, and wherein said conversion adaptor further includes:
first temporary storage for temporarily storing the image display data supplied from said processor; and a read controller for controlling timing for reading the image display data stored in said first temporary storage and outputting the image display data to said signal converter, wherein said conversion adaptor is relationally connected with a first operator, said processor carries out processing made in response to an operation signal from said first operator, wherein said processor transmits a control signal to said first operator.

* * * * *